(12) United States Patent
Lem et al.

(10) Patent No.: US 10,471,874 B2
(45) Date of Patent: Nov. 12, 2019

(54) MASSAGE BLADDER MATRIX

(71) Applicant: Ford Global Technologies, LLC, Dearborn, MI (US)

(72) Inventors: Jeroen Lem, Maastricht (NL); Jessica Rausch, Moenchengladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 14/828,834

(22) Filed: Aug. 18, 2015

(65) Prior Publication Data

US 2016/0059750 A1 Mar. 3, 2016

(30) Foreign Application Priority Data

Sep. 2, 2014 (DE) .................. 10 2014 217 478

(51) Int. Cl.
*B60N 2/90* (2018.01)
*A61H 9/00* (2006.01)

(52) U.S. Cl.
CPC .......... *B60N 2/976* (2018.02); *A61H 9/0078* (2013.01); *B60N 2/914* (2018.02); *A61H 2201/0149* (2013.01); *A61H 2201/5002* (2013.01); *A61H 2203/0431* (2013.01); *A61H 2205/081* (2013.01)

(58) Field of Classification Search
CPC .... B60N 2/448; B60N 2/4415; A61H 9/0078; A61H 9/0028; A61H 2201/5005; A61H 2201/1623; A61H 2201/1207; A61H 2201/5002; A61H 2201/0149; A61H 2203/0431; A61H 2205/081
See application file for complete search history.

(56) References Cited

U.S. PATENT DOCUMENTS

| | | | |
|---|---|---|---|
| 2,958,369 | A | 11/1960 | Pitts et al. |
| 3,403,938 | A | 10/1968 | Cramer et al. |
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |
| 4,541,669 | A | 9/1985 | Goldner |
| 4,629,248 | A | 12/1986 | Mawbey |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Sundhara M Ganesan
(74) *Attorney, Agent, or Firm* — Vichit Chea; Price Heneveld LLP

(57) ABSTRACT

A vehicle seat includes a frame, a seat support, a first arrangement of a first plurality of deformation elements between the frame and the seat support. The deformation elements are arranged directly adjacent to one another in a two-dimensional matrix arrangement and are changeable in respective shapes thereof independently of one another.

10 Claims, 5 Drawing Sheets

(56) References Cited

U.S. PATENT DOCUMENTS

| | | | |
|---|---|---|---|
| 4,720,141 A | 1/1988 | Sakamoto et al. | |
| 4,720,146 A | 1/1988 | Mawbey et al. | |
| 4,915,447 A | 4/1990 | Shovar | |
| 5,171,062 A | 12/1992 | Courtois | |
| 5,174,526 A | 12/1992 | Kanigowski | |
| 5,379,471 A * | 1/1995 | Holdredge | A61G 5/1043 297/DIG. 8 |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,092,249 A * | 7/2000 | Kamen | A47C 4/54 5/653 |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,203,105 B1 | 3/2001 | Rhodes, Jr. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,072,764 B2 | 7/2006 | Donath et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,234,771 B2 | 6/2007 | Nakhla | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,382,240 B2 | 6/2008 | Egelhaaf | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,111,147 B2 | 2/2012 | Litkouhi | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,616,654 B2 | 12/2013 | Zenk et al. | |
| 2002/0190549 A1* | 12/2002 | Chien-Chuan | A61H 9/0078 297/217.3 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2006/0049678 A1* | 3/2006 | Kern | A47C 7/467 297/284.3 |
| 2006/0217644 A1* | 9/2006 | Ozaki | A61H 9/0078 601/148 |
| 2007/0120401 A1 | 5/2007 | Minuth et al. | |
| 2008/0080793 A1* | 4/2008 | Kitou | A61H 9/0078 383/3 |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0031449 A1* | 2/2010 | Cheng | A61H 9/0078 5/713 |
| 2010/0038937 A1 | 3/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |

(56) References Cited

U.S. PATENT DOCUMENTS

| | | |
|---|---|---|
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0342366 A1 | 12/2013 | Kiefer et al. |
| 2014/0032043 A1 | 1/2014 | Line et al. |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.conn/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.htnnl, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

\* cited by examiner

MASSAGE BLADDER MATRIX

CROSS REFERENCE TO RELATED APPLICATION

This patent application claims the priority of German Patent Application No. 102014217478.3, filed on Sep. 2, 2014, entitled "VEHICLE SEAT WITH MASSAGE FUNCTION", the entire contents of which is hereby incorporated by reference in its entirety.

FIELD OF THE INVENTION

The present invention generally relates to a seat and, in particular, a vehicle seat having a frame, a seat support and at least one deformation element between the frame and seat support.

BACKGROUND OF THE INVENTION

Seats of motor vehicles have been equipped with various forms of massage functions. Such motor vehicle seats have, for example, been provided with a plurality of large air bladders below the seat surface and inside the backrest which are able to be pressurized hydraulically or pneumatically in order to perform a type of massage by changing the pressurization of the individual large air bladders to perform a non-moving massage over a large, defined area. An improved massage, however, may be achieved by applying a force over an area that is smaller than the overall area to be massaged with the force moving within the area, including along a particular muscle. Such movement can provide a feeling of pulling and pushing forces or circulating forces that act on or along the respective area by movement of a force smaller than the area.

SUMMARY OF THE INVENTION

According to one aspect of the present invention, a vehicle seat includes a frame, a seat support, a first arrangement of a first plurality of deformation elements between the frame and the seat support. The deformation elements are arranged directly adjacent to one another in a two-dimensional matrix arrangement and are changeable in respective shapes thereof independently of one another.

According to another aspect of the present invention, a method for massaging a passenger of a seat includes activating, in an independent and individual manner, a plurality of deformation elements. The deformation elements can be included in a first arrangement thereof and can be positioned between a frame and a support of the seat. The deformation elements are arranged directly adjacent to one another in a two-dimensional matrix arrangement. The activation of the plurality of deformation elements is carried out to change respective shapes thereof in a targeted manner such that a locally changing force acts on a first massaged region.

In this manner, a seat, such as a motor vehicle seat, can be provided in which a targeted massage of respective muscles or body areas. Further, in such an arrangement, it is possible to at least locally change the forces that act on a respective area.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
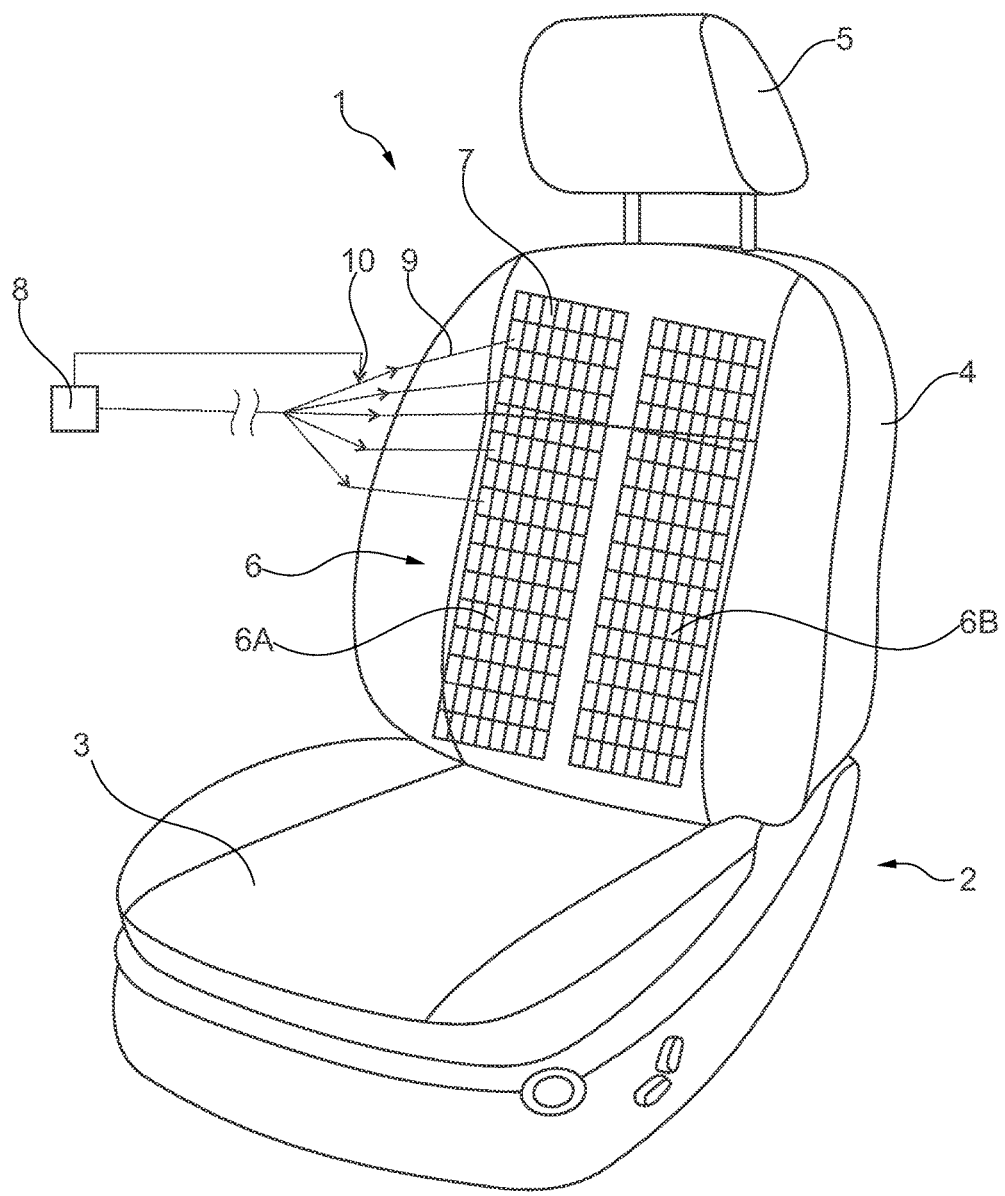
FIG. 1 shows a schematic perspective view of a motor vehicle seat including multiple arrangements of massage elements in a backrest thereof.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

In a vehicle seat, a plurality of deformation elements can be arranged directly adjacent to one another in a two-dimensional matrix arrangement. In such an arrangement, wherein the individual deformation elements are able to be changed in shape independently of one another such that it is possible to implement locally changing forces that act within a respective area that simulate movement of an article thereover. In other words, it is possible, due to a combination of a generally smaller size of the deformation elements and the distribution and number of deformation elements, to provide moving, circulating and pushing forces, as well as forces simulating a pulling action, to act on the desired area for the massage. In one implementation, the point or points where the shape of the deformation elements changes may be specifically altered in the manner of a segment display. In this manner, the patterns of the massage may remain the same but the local arrangement thereof can be changed to produce an "authentic" moving massage pattern that replicates massage, for example, by another human being or the like. Circulating or linear massage patterns may be produced in a similar manner. By means of linear massage patterns, which may be arranged from inside to outside relative to the muscle or the body area, it is possible to simulate the pulling action which is usually used in massages carried out by human beings.

The deformation elements may be arranged in a region of the seat cushion and/or the backrest. Further, the two-dimensional matrix arrangement may be a grid-like arrangement of the deformation elements in vertical and/or horizontal alignment. In one example, the seat may have at least two matrix-type two-dimensional arrangements spaced on opposing horizontal sides of the seatback with each extending in a vertical manner. In an example where at least one arrangement is provided in a region of the backrest, it may be advantageous if two two-dimensional matrix arrangements are configured in parallel, spaced apart and adjacent to one another and extending in the vertical direction, so that both back halves may be massaged independently of one another.

In one example, the deformation elements are air bladders which are able to be pressurized pneumatically or hydraulically and which have individually assigned and individually activatable valves so that each individual air bladder is able to be pressurized by a corresponding massage control unit. It is also conceived that deformation elements that are able to be altered electrically or electronically can be used. In general, the massage of a passenger seated in a seat implemented by providing locally changing forces acting on a respectively massaged area by means of deformation elements that are arranged in a matrix-type two-dimensional manner and that are independently and individually activated in a targeted manner in order to change the respective shapes thereof. The deformation elements may be activated in a targeted manner to produce moving forces, to produce circulating forces, or the like.

Referring to FIG. 1, reference numeral 1 generally designates a motor vehicle seat that has a frame 2. In a conventional manner, a seat surface 3 and a backrest 4 as well as a headrest 5 serve as seat supports for a passenger or occupant of seat 1. In the region of the backrest 4, two massage elements in the form of two two-dimensional matrix arrangements 6 of deformation elements 7 are arranged between the seat support (3 or 4) and the frame 2. The arrangements 6 extend in parallel in the vertical direction and are arranged so as to be spaced apart and adjacent to one another. Such a configuration allows the two back halves of the occupant to be massaged independently of one another.

Each arrangement 6 includes a plurality of individual deformation elements 7 that extend both vertically and horizontally in the above-mentioned two-dimensional matrix formation and are positioned adjacent to one another. The individual deformation elements 7 are able to be pressurized pneumatically in one of various predetermined patterns, modes, or the like to implement the above-described massage functionality by way of changing the respective shapes thereof from a generally flat, uninflated shape to an expanded, inflated shape. The deformation elements 7 (which may also be referred to as air cushions) collectively make up the above-described matrix element. The deformation elements 7 are able to be pressurized by a compressed air (or hydraulic fluid) supply and control unit 8 via lines 9 in a targeted manner and independently of one another. To facilitate such individual pressurization, each line 9 may include a respective valve 10 that may be in communication with control unit 8 for opening and closing thereof, according to one of a plurality of predetermined patterns or schemes.

Figure 2:
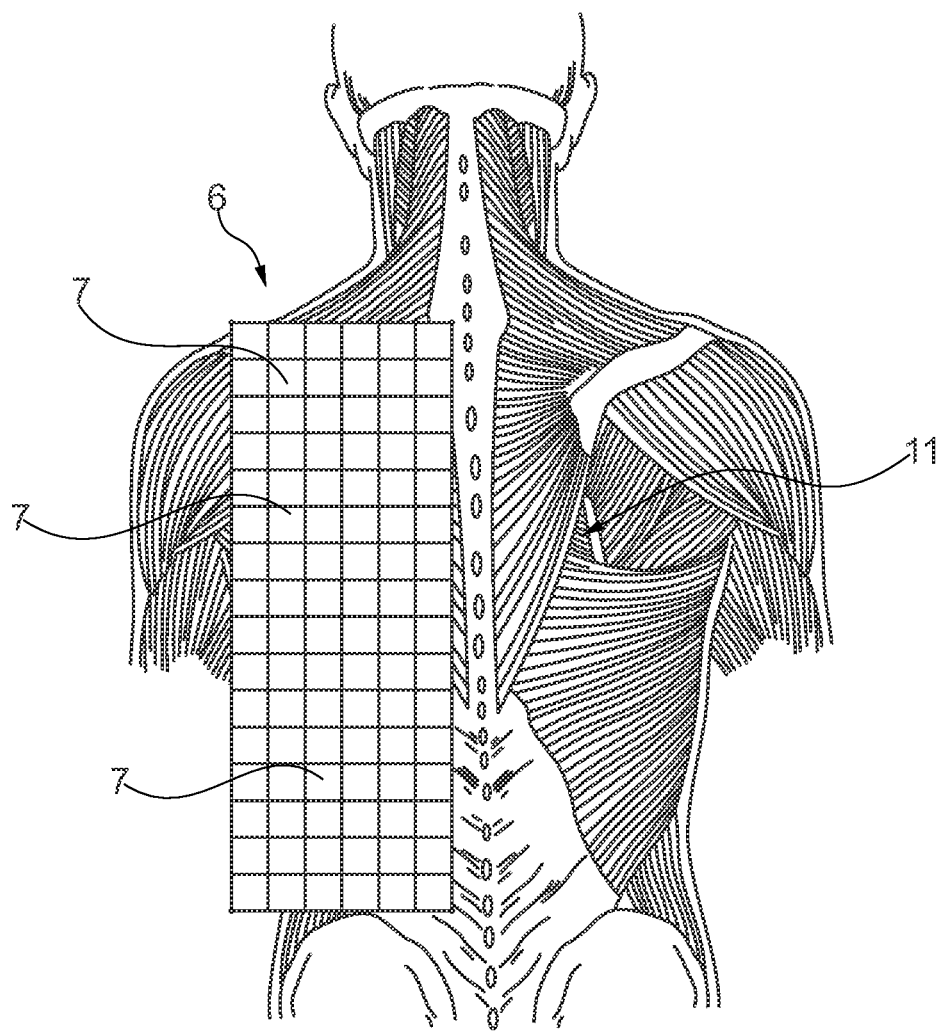
FIG. 2 shows the arrangement of massage elements of FIG. 1 relative to the muscular system of the human back.

The matrix-type arrangement of the air cushions 7 in two dimensions relative to the human back 1 is illustrated in FIG. 2. It may be seen that the small size of the individual deformation elements 7 relative to the overall area collectively covered by the overall arrangement 6 thereof enables the massage force applied by selected ones of the deformation elements 7 to be dynamically altered, resulting a locally changing force that may be in the form of moving, circulating or pushing forces, as well as forces simulating a pulling action, acting on a desired region of the back 11 for the massage.

Figure 3:
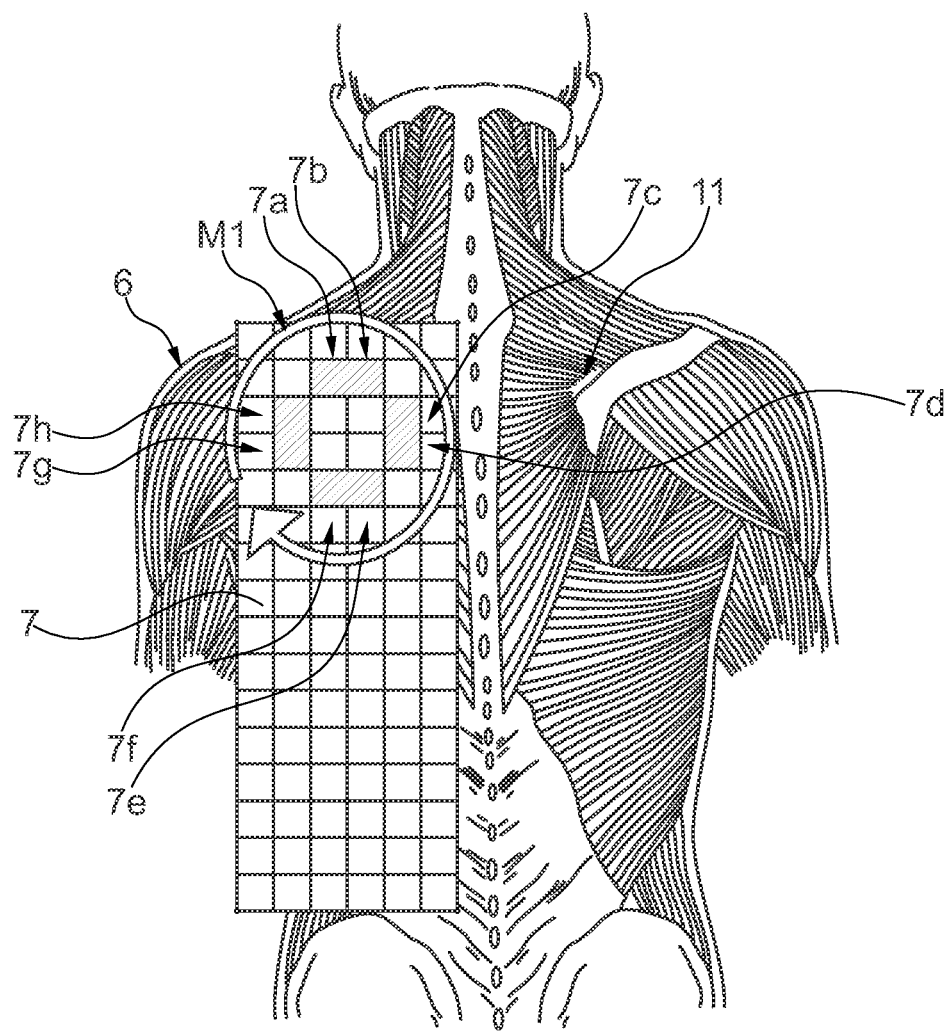
FIG. 3 shows the arrangement of massage elements of FIG. 2 implementing a circulating massage.

FIG. 3 shows an example of a circulating massage motion M1 that may be implemented using arrangement 6 by selective manipulation of deformation elements 7 by control unit 8. In implementing this mode, various ones of air cushions 7a to 7h are successively pressurized and deflated in a clockwise direction to produce circulating pressure regions to simulate a circularly moving massage.

Figure 4:
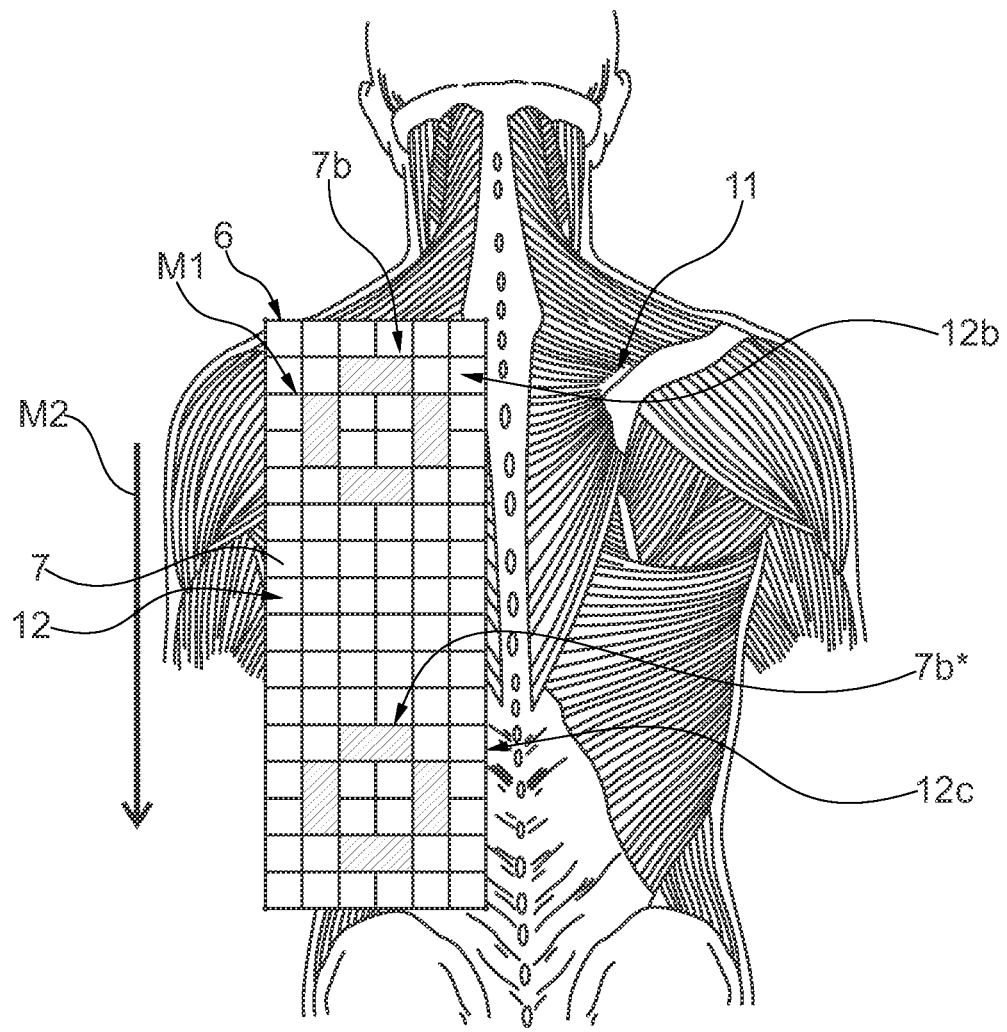
FIG. 4 shows the arrangement of massage elements of FIG. 2 implementing a circular massage in a moving manner.

In FIG. 4 a moving massage function M2 is shown as a variant of the function illustrated in FIG. 3. In the illustrated example, the overall massage function includes the massage function M1, wherein the successively pressurized air cushions 7a to 7h are manipulated according to a circular activation sequence within a portion of the back 11. Additionally, as the circular activation sequence cycles, the overall application area (i.e. the circle itself) is moved downwardly within the matrix arrangement 6. That is, the particular circle of deformation elements 7 to be pressurized moves one row 12 down, after the respective pressurization of an air cushion 7a to 7h, so that a moving, circulating, pushing motion is produced in the manner of a running display. For example, the air cushion 7b can be pressurized in the row 12b in the first cycle. Subsequently, the pressurized circle can move downwardly, as indicated, resulting in the air cushions 7b* in row 12L being pressurized.

Figure 5:
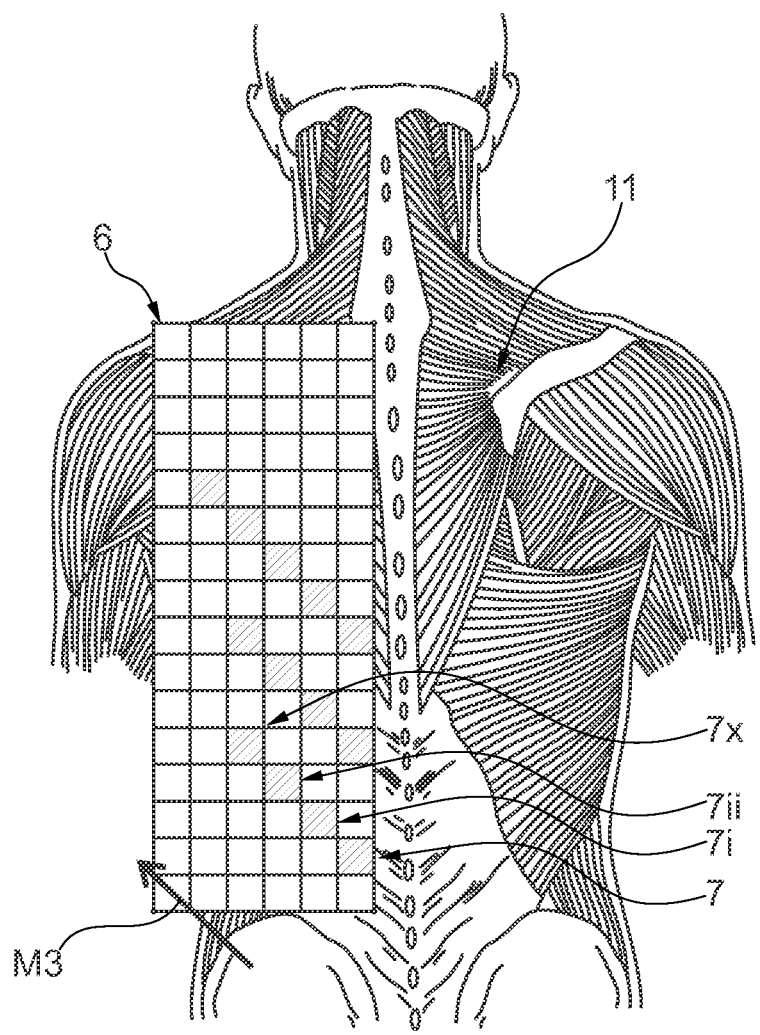
FIG. 5 shows the arrangement of massage elements of FIG. 2 implementing a linear massage in a moving manner.

In a similar manner, the linear massage function M3 shown in FIG. 5 may be implemented. The linear massage function can be implemented so as to extend diagonally from an inside (i.e. in the vicinity of the spinal column) to an outside (remote from the spinal column) of the back. In this manner, air cushions 7, 7i, 7ii, . . . 7x, which are located diagonally relative to one another, can be successively pressurized. At the same time, it may be possible either to perform a plurality of parallel linear massages M3 in an approximately strip-shaped manner, or to permit the massage function to move, in a row-by-row manner similar to that discussed above with respect to FIG. 4.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
   a frame;
   a seat support defining a centerline; and
   a first arrangement of a first plurality of deformation elements positioned between the frame and the seat support on a first side of the centerline, the deformation elements subdividing the first arrangement;
   wherein the first arrangement of the first plurality of deformation elements includes at least four deformation elements arranged directly adjacent to one another in a two-dimensional matrix-type grid arrangement, wherein:
      at least first and second deformation elements are arranged sequentially adjacent each other in a first row extending in a first direction away from the centerline;
      at least third and fourth deformation elements are arranged sequentially adjacent each other in a second row extending in the first direction away from the centerline;
      at least the first and third deformation elements are arranged sequentially adjacent each other in a first column extending in a second direction parallel to the centerline;
      at least the second and fourth deformation elements are arranged sequentially adjacent each other in a second column extending in the second direction parallel to the centerline; and
      the deformation elements are changeable in the respective shapes thereof independently of one another by activating ones of the deformation elements in an independent and individual manner to change respective shapes of the ones of the deformation elements in a targeted manner with a locally changing force acting on a first region in both horizontal and vertical directions with respect to the centerline.

2. The vehicle seat of claim 1, wherein the seat support is one of a seat cushion and a backrest.

3. The vehicle seat of claim 1, wherein the deformation elements are air bladders configured to be activated by being independently pressurized by one of pneumatic and hydraulic pressure.

4. The vehicle seat of claim 1, wherein the first and second rows and the first and second columns extend in respective linear manners.

5. The vehicle seat of claim 1, further including a second arrangement of a second plurality of deformation elements between the frame and the seat support on a second side of the centerline opposite the first side of the centerline.

6. The vehicle seat of claim 5, wherein:
   the seat support is a backrest; and
   the first and second arrangements are positioned with respect to the backrest so as to extend generally parallel to each other and to have a major axis extending in a vertical direction.

7. A method for massaging a passenger of a seat, comprising:
   activating, in an independent and individual manner, a plurality of deformation elements included in a first arrangement of at least four deformation elements between a frame and a support of the seat on a first lateral side of a centerline of the seat, the deformation elements being arranged directly adjacent to one another in a two-dimensional matrix-type grid arrangement, wherein:
      at least first and second deformation elements are arranged sequentially adjacent each other in a first row extending in a first direction away from the centerline;
      at least third and fourth deformation elements are arranged sequentially adjacent each other in a second row extending in the first direction away from the centerline;
      at least the first and third deformation elements are arranged sequentially adjacent each other in a first column extending in a second direction parallel to the centerline;
      at least the second and fourth deformation elements are arranged sequentially adjacent each other in a second column extending in the second direction parallel to the centerline; and
   the activation of the plurality of deformation elements changes respective shapes thereof in a targeted manner with a locally changing force acting on a first massaged region in both horizontal and vertical directions within the first lateral side of the centerline.

8. The method of claim 7, wherein the targeted manner in which the deformation elements are activated includes activating the deformation elements in a sequence of adjacent deformation elements to produce a moving force.

9. The method of claim 7, wherein the targeted manner in which the deformation elements are activated includes activating the deformation elements in a sequence of adjacent deformation elements to produce a circulating force.

10. The method of claim 7, wherein activating the plurality of deformation elements includes sequentially activating multiple ones of the deformation elements both vertically with the centerline and horizontally away from the centerline.

* * * * *